United States Patent [19]

Yu et al.

[11] Patent Number: 5,703,597
[45] Date of Patent: Dec. 30, 1997

[54] ADAPTIVE CARRIER PHASE LOCK LOOP IN A GPS RECEIVER

[75] Inventors: Jimmy Yu, Olathe, Kans.; Guy Lewellen, Northants, United Kingdom

[73] Assignee: AlliedSignal, Inc., Morristown, N.J.

[21] Appl. No.: 577,502

[22] Filed: Dec. 22, 1995

[51] Int. Cl.[6] .............................. H04B 7/185; G01S 5/02
[52] U.S. Cl. ...................... 342/357; 364/449.7; 455/260
[58] Field of Search ........................ 342/357; 364/449.7; 455/260; 375/240, 327, 376; 329/360, 307, 325

[56] References Cited

U.S. PATENT DOCUMENTS

| | | |
|---|---|---|
| 4,336,616 | 6/1982 | Carson et al. . |
| 4,485,383 | 11/1984 | Maher ........................... 342/352 |
| 4,578,678 | 3/1986 | Hurd ............................. 342/357 |
| 4,594,727 | 6/1986 | Pierce . |
| 4,613,977 | 9/1986 | Wong et al. . |
| 4,651,154 | 3/1987 | Wong et al. . |
| 4,691,176 | 9/1987 | Hsiung et al. . |
| 4,928,106 | 5/1990 | Ashjaee et al. ................ 342/352 |
| 5,049,830 | 9/1991 | Yoshida . |
| 5,150,384 | 9/1992 | Cahill . |
| 5,175,729 | 12/1992 | Borras et al. . |
| 5,247,543 | 9/1993 | Tsuda et al. . |
| 5,576,715 | 11/1996 | Litton et al. .................. 342/357 |

*Primary Examiner*—Theodore M. Blum

[57] ABSTRACT

A method and apparatus for automatically adjusting the bandwidth of a GPS receiver's phase lock loop in response to acceleration changes of the tracked vehicle. The bandwidth is increased when the vehicle's acceleration rate exceeds a pre-determined value for maintaining phase lock loop and is reduced when the vehicle's acceleration rate drops below a pre-determined value for reducing the amount of noise introduced into the phase lock loop.

16 Claims, 1 Drawing Sheet

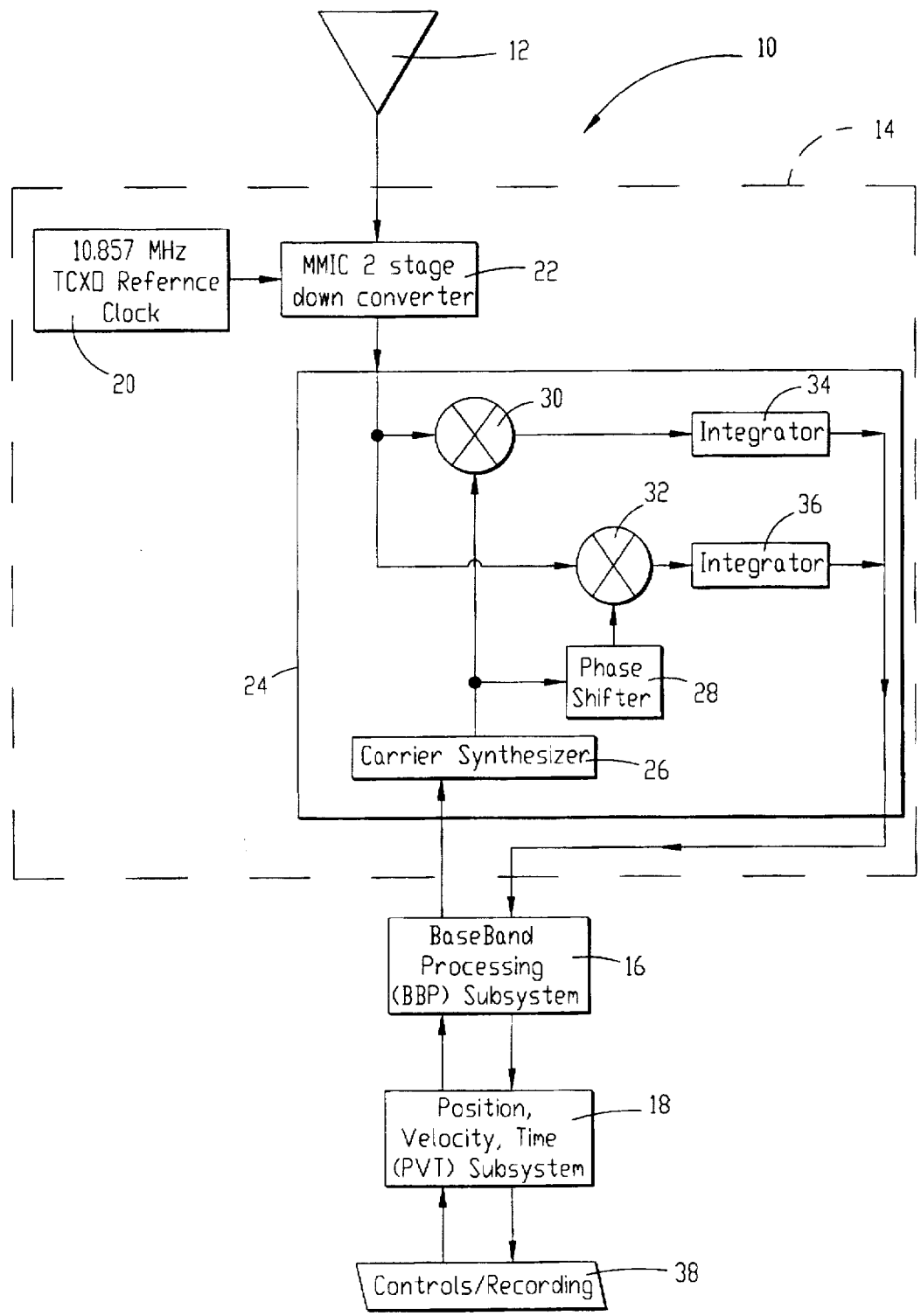

ADAPTIVE CARRIER PHASE LOCK LOOP IN A GPS RECEIVER

BACKGROUND OF THE INVENTION

1. Field of the Invention

The present invention relates to global positioning system (GPS) receivers operable for navigation and tracking vehicles such as aircrafts, land vehicles, and boats, and more particularly to a method and apparatus for automatically adjusting the bandwidth of a GPS receiver's phase lock loop in response to acceleration rate changes of the tracked vehicle.

2. Description of the Prior Art

GPS receivers receive satellite signals from GPS satellites and generate replica signals used to track or match the received signals. The GPS receivers must establish and maintain phase lock loop between the received satellite signals and the generated replica signals to calculate the Doppler frequency of the GPS receiver relative to the satellite.

The bandwidth of a GPS receiver's phase lock loop is dictated by two competing variables. First, the bandwidth of the phase lock loop should be narrow enough to reduce the amount of noise measured by the loop. Second, the bandwidth of the phase lock loop should be wide enough so that the GPS receiver does not lose lock when the vehicle is maneuvering and/or accelerating. For example, aircraft-mounted GPS receivers must maintain phase lock loop when the aircraft is rapidly accelerating, decelerating or maneuvering. Thus, it is desirable to have a wide phase lock loop bandwidth during these high dynamic conditions. However, when the aircraft is merely cruising at a steady velocity it is desirable to have a narrower phase lock loop bandwidth so that noise introduced into the phase lock loop can be held to a minimum.

Prior art GPS receivers have phase lock loops with fixed bandwidths and thus are not operable for adjusting the bandwidth of the phase lock loop to compensate for changes in the acceleration of the tracked vehicle. This is problematic because if the bandwidth is set too narrow, the GPS receiver will lose phase lock loop when the tracked vehicle maneuvers and/or rapidly accelerates or decelerates. Conversely, if the bandwidth is set too wide, the GPS receiver will introduce excess noise into the phase lock loop when the vehicle is merely cruising. Accordingly, there is a need for a method and apparatus for adjusting the bandwidth of a GPS receiver's phase lock loop in response to changes in the acceleration rate of the tracked vehicle.

SUMMARY OF THE INVENTION

The present invention solves the prior art problems discussed above and provides a distinct advance in the art of GPS receivers. More particularly, the invention hereof provides a method for adjusting the bandwidth in a GPS receiver's phase lock loop in response to changes in the acceleration rate of the tracked vehicle. In the preferred embodiment, the method includes the steps of calculating the acceleration rate of the vehicle and adjusting the bandwidth of the phase lock loop to compensate for changes in the acceleration rate of the vehicle. The bandwidth is increased when the vehicle's acceleration rate exceeds a pre-determined value for maintaining phase lock loop and is reduced when the vehicle's acceleration rate declines below a predetermined value for reducing the amount of noise introduced into the phase lock loop.

In preferred forms, the calculated acceleration rate is compared to acceleration rate ranges provided in a look-up table. The look-up table has a plurality of phase lock loop bandwidth values and integration time period values corresponding to the acceleration rate ranges. Once the vehicle's acceleration rate is measured, the bandwidth value corresponding to this measured acceleration rate is provided to the GPS receiver for adjusting the bandwidth of the phase lock loop. Similarly, the integration time period corresponding to this measured acceleration rate is provided to the GPS receiver for adjusting the integration time period of the GPS receiver.

BRIEF DESCRIPTION OF THE DRAWING FIGURE

The single drawing FIGURE is a block diagram representing a GPS receiver constructed in accordance with the preferred embodiment of the present invention.

DETAILED DESCRIPTION OF THE PREFERRED EMBODIMENTS

As illustrated in the drawing FIGURE, the preferred GPS system 10 broadly includes antenna 12, GPS receiver 14, baseband subsystem 16, and position, velocity, time (PVT) subsystem 18. As described in more detail below, the preferred method of the present invention is implemented by an operating program that is stored in the memory of the GPS system 10.

In more detail, antenna 12 is preferably provided by Allied Signal of Olathe, Kansas and is operable for receiving satellite signals from one or more GPS satellites. Those skilled in the art will appreciate that the received satellite signals include navigation signals L1 and L2 transmitted at frequencies of 1,575.42 MHz and 1,227.6 MHz, respectively, a precision P code, and a coarse acquisition C/A code. In preferred forms, antenna 12 includes filters and amplifiers for filtering and amplifying the received satellite signals. The antenna delivers the filtered and amplified satellite signals to GPS receiver 14 as described below.

GPS receiver 14 is preferably a GPS XPRESS model receiver manufactured by Allied Signal of Olathe, Kansas, or an equivalent GPS receiver. As illustrated, GPS receiver 14 broadly includes reference clock 20, down converter 22, and baseband detector 24.

Reference clock 20 provides the receiver's internal timing for down converting the received satellite signals. Down converter 22 converts the received satellite signals to lower frequency IF signals to be processed digitally by baseband detector 24. Preferred down converter 16 is a two-stage down converter.

Baseband detector 24 includes carrier synthesizer 26, phase shifter 28, signal mixers 30 and 32, and signal integrators 34 and 36. In preferred forms, baseband detector 24 is an application specific integrated circuit including 8 channels for processing I and Q signal samples from 8 satellites in parallel.

Baseband detector 24 first receives and samples the down converted IF signals from down converter 22. The carrier synthesizer 26 acts as a numeric controlled oscillator for generating replica signals of the down converted IF signals. These replica signals are used for tracking the IF signals.

The replica signals are sent to mixer 30 where they are mixed with the incoming IF signals. The output of this mixing is an in-phase (I) amplitude sample which represents the frequency and phase difference or error between the generated replica signal and the incoming IF signal.

The replica signals are also sent to phase shifter 28 where they are phase shifted by 90 degrees. These phase shifted signals are then sent to mixer 32 where they are mixed with the incoming IF signals. The output of this mixing is an out-of-phase or quadrature (Q) amplitude sample of the IF signals which also represents the frequency and phase difference or error between the generated replica signal and the incoming IF signals.

Integrators 34 and 36 accumulate or integrate the I and Q samples over an integration time period, resulting in I and Q measurements. These I and Q measurements are then sent to baseband subsystem 16 for further processing.

Baseband subsystem 16 is preferably an EPROM electrically coupled with baseband detector 24 but may also include other conventional memory storage and data processing devices. Baseband subsystem 16 receives the I and Q measurements from baseband detector 24 and implements a phase lock loop tracking routine to lock the replicated signals generated by baseband detector 24 with the incoming IF signals. The phase lock loop tracking routine of the present invention is preferably implemented by phase lock loop software stored in baseband subsystem 16.

The phase lock loop software processes the cumulated I and Q measurements to determine the error or difference in the phase and frequency between the incoming IF signals and the replica signals generated by carrier synthesizer 26. The GPS system 10 of the present invention preferably uses a second-order phase lock loop; however, any order of phase lock loop may be utilized, including third and fourth order phase lock loops.

After determining these errors, the phase lock loop software creates a frequency shift and phase shift command, represented by Z. The frequency shift and phase shift command Z is sent to the baseband detector to alter the phase and frequency of the generated replica signals generated by carrier synthesizer 26. This loop is continued until the generated replica signals match or track the incoming IF signal, resulting in phase lock loop.

The algorithms processed by the phase lock loop software are as follows:

$$Z = X_{(K+1)} + Qe\alpha$$

$$X_{(K+1)} = X_K + Qe\beta$$

$$Qe = \frac{Q}{\sqrt{I^2 + Q^2}} \times \text{Sign}(I)$$

where Z is the frequency shift and phase shift commands generated by the software and sent to carrier synthesizer 26, $\alpha$ is the coefficient for adjusting the tracking phase of the replicated signals, $\beta$ is the tracking frequency of the replicated signals, and $Q_e$ is the error between the replicated signals and the incoming IF signals.

As described in more detail below, the preferred method of the present invention adjusts the $\alpha$ and $\beta$ values in the above-referenced equations in response to acceleration rate changes of the tracked vehicle to automatically adjust the bandwidth of the GPS receiver's phase lock loop. The preferred method also automatically adjusts the integration time period of integrators 34 and 36.

PVT subsystem 18 implements the preferred method for adjusting the bandwidth of the above-described phase lock loop. PVT subsystem 18 is preferably an EPROM electrically coupled with baseband detector 24 but may also include other conventional memory storage and data processing devices. The method of the present invention is preferably implemented by position, velocity, time (PVT) software stored in PVT subsystem 18.

In general, the method performed by the PVT software includes the steps of calculating the acceleration rate of the vehicle to which GPS receiver 14 is mounted and adjusting the bandwidth of the GPS receiver's phase lock loop to compensate for changes in the acceleration rate of the vehicle. In this way, the bandwidth of the phase lock loop can be increased when the vehicle maneuvers and/or accelerates or decelerates for maintaining phase lock loop and can be reduced when the vehicle is not accelerating or decelerating to reduce the amount of noise introduced into the phase lock loop.

In more detail, the PVT software first computes position, velocity, and time using measurements from the GPS receiver 14 for use in calculating the vehicle's angular acceleration and linear acceleration. The PVT software then calculates the vehicle's angular acceleration rate with the following algorithms:

$$\Psi = \tan - 1(v_e/v_n)$$

$$d\Psi = \frac{1}{1 + \left(\frac{v_e}{v_n}\right)^2} \times \frac{v_n dv_e - v_e dv_n}{v_n^2} = \frac{v_n dv_e - v_e dv_n}{v_n^2 + v_e^2}$$

$$a_n = \frac{d\Psi}{dt} \times \sqrt{v_n^2 + v_n^2}$$

where $\psi$ is the heading of the vehicle, $V_e$, $V_n$ and $V_u$ are the three-dimensional velocity components of the vehicle, and $a_n$ is the vehicle's angular acceleration rate.

The PVT software then calculates the vehicle's linear acceleration rate with the following algorithm:

$$a_1 = d \frac{\sqrt{v_n^2 + v_n^2}}{dt}$$

The PVT software then compares the vehicle's angular and linear acceleration rates and determines the vehicle's maximum acceleration rate with the following algorithm:

$$a_{max} = \max(a_n, a_1)$$

Finally, the PVT software compares this maximum acceleration rate to acceleration rate ranges provided in a look-up table similar to the following:

| Acceleration Rate | Phase Lock Loop Bandwidth | Pre-filter Integration Period | α | β |
|---|---|---|---|---|
| $a_{max} \leq 1.0\ g\ (g = 9.81\ m/s/s)$ | 3.1 Hz | 10 millisecond | 48/5 | 10 |
| $1.0\ g < a_{max} \leq 3.0\ g$ | 5.2 Hz | 4 millisecond | 12 | 4 |
| $3.0\ g < a_{max}$ | 7.4 Hz | 1 millisecond | 16 | 1 |

The look-up table is preferably stored in baseband subsystem 16 or PVT subsystem 18 but may also be stored in a separate memory device. As shown, the look-up table includes phase lock loop bandwidth values, integration time period values, alpha values and beta values corresponding to the different acceleration rate ranges. Once the vehicle's maximum acceleration rate is calculated and identified in the look-up table, the corresponding integration time period value is sent to baseband detector 24 for adjusting the integration time period of integrators 34 and 36. Similarly, the corresponding alpha and beta values are sent to the phase lock loop software for use in calculating the frequency shift and phase shift commands (Z) that are sent to baseband detector 24 to alter the phase and frequency of the generated replica signals generated by carrier synthesizer 26.

Those skilled in the art will appreciate that the look-up table may include an unlimited number of acceleration ranges and corresponding phase lock loop bandwidth values, integration time period values, alpha values and beta values. In this way, the method of the present invention can adjust the bandwidth of the phase lock loop to most optimally maintain phase lock loop while reducing the amount of noise measured by the loop.

As illustrated, PVT subsystem 18 may be coupled with other control and/or recording devices 38 such as computers, display screens, printers and the like for displaying, printing and processing the outputs of PVT subsystem 18 and for inputting data into PVT subsystem 18.

Although the invention has been described with reference to the preferred embodiment illustrated in the attached drawing figures, it is noted that equivalents may be employed and substitutions made herein without departing from the scope of the invention as recited in the claims. For example, although the method of the present invention is preferably performed by software, it can also be embodied in hardware.

Having thus described the preferred embodiment of the invention, what is claimed as new and desired to be protected by Letters Patent includes the following:

1. In a GPS system including a receiver operable for tracking the position of a vehicle, the receiver including receiving means for receiving signals from a GPS satellite, generating means for generating replica signals of the received signals, comparing means for comparing the replica signals with the received signals, and a phase lock loop for shifting the replica signals until they match the received signals and for locking the replica signals with the received signals, a method for automatically adjusting the bandwidth of the phase lock loop, said method comprising the steps of:
   (a) calculating the acceleration rate of the vehicle; and
   (b) in response to step (a), altering the bandwidth of said phase lock loop in correlation with said calculated acceleration rate for maintaining the lock between the replica signals and the received signals.

2. The method as set forth in claim 1, step (b) including the step of increasing the bandwidth of said phase lock loop when the vehicle's acceleration rate exceeds a pre-determined value.

3. The method as set forth in claim 2, step (b) further including the step of decreasing the bandwidth of said phase lock loop when the vehicle's acceleration rate drops below a pre-determined value.

4. The method as set forth in claim 1, step (a) including the step of calculating the angular acceleration rate of the vehicle.

5. The method as set forth in claim 4, step (a) further including the step of calculating the linear acceleration rate of the vehicle.

6. The method as set forth in claim 5, further including the steps of comparing said angular acceleration rate with said linear acceleration rate and determining the maximum of said angular and linear acceleration rates.

7. The method as set forth in claim 6, further including the steps of:
   comparing said maximum acceleration rate to acceleration rate ranges provided in a look-up table, the look-up table having phase lock loop bandwidth values corresponding to the acceleration rate ranges, and
   adjusting the bandwidth of said phase lock loop so that it equals the bandwidth value in said look-up table corresponding to said maximum acceleration rate.

8. The method as set forth in claim 1, said receiver including means for integrating the difference between said replica signals and said received signals over an integration time period, said method further including the step of adjusting said integration time period in response to step (a) to maintain the lock of said phase lock loop when the vehicle's acceleration rate changes.

9. The method as set forth in claim 8, further including the step of decreasing said integration time period when the vehicle's acceleration rate exceeds a predetermined value.

10. The method as set forth in claim 9, further including the step of increasing said integration time period when the vehicle's acceleration rate is below a pre-determined value.

11. In a GPS system including a receiver operable for tracking the position of a vehicle, the receiver including receiving means for receiving signals from a GPS satellite, generating means for generating replica signals of the received signals, comparing means for comparing the replica signals with the received signals, integrating means for integrating the difference between the replica signals and the received signals over an integration time period, and a phase lock loop for shifting the replica signals until they match the received signals and for locking the replica signals with the received signals when the replica signals match the received signals, a method for automatically adjusting the bandwidth of the phase lock loop, said method comprising the steps of:
   (a) calculating the angular acceleration rate of the vehicle;
   (b) calculating the linear acceleration rate of the vehicle;
   (c) comparing said angular acceleration rate with said linear acceleration rate;
   (d) determining the maximum of said angular and linear acceleration rates;
   (e) comparing said maximum acceleration rate to acceleration rate ranges provided in a look-up table, the look-up table having phase lock loop bandwidth values and integration time period values corresponding to the acceleration rate ranges;
   (f) adjusting the bandwidth of said phase lock loop so that it equals the bandwidth value in said look-up table corresponding to said maximum acceleration rate; and
   (g) adjusting the integration time period of said integrating means so that it equals the integration time period value in said look-up table corresponding to said maximum acceleration rate.

12. The method as set forth in claim 11, step (a) including the step of calculating changes in the heading of the vehicle for calculating said angular acceleration rate.

13. The method as set forth in claim 12, step (b) including the step of calculating changes in the groundspeed of the vehicle for calculating said linear acceleration rate.

14. A GPS receiver adapted for tracking the position of a vehicle, said receiver comprising:
   receiving means for receiving signals from a GPS satellite;
   generating means for generating replica signals of said received signals;
   comparing means for comparing said replica signals with said received signals;
   shifting means for shifting said replica signals until they match said received signals;
   a phase lock loop for locking said replica signals with said received signals once said tracking signals match said received signals; and
   control means for maintaining the lock of said phase lock loop, said control means including calculating means for calculating the acceleration rate of the vehicle, and adjusting means for adjusting the bandwidth of said phase lock loop in response to said calculated acceleration rate to maintain the lock in said phase lock loop when the vehicle's acceleration rate changes.

15. The GPS receiver as set forth in claim 14, said adjusting means including means for increasing the bandwidth of the phase lock loop when the vehicle's acceleration rate exceeds a pre-determined value.

16. The GPS receiver as set forth in claim 14, said adjusting means further including means for decreasing the bandwidth of the phase lock loop when the vehicle's acceleration rate drops below a pre-determined value.

\* \* \* \* \*